(12) United States Patent
Tan et al.

(10) Patent No.: US 11,537,885 B2
(45) Date of Patent: Dec. 27, 2022

(54) FREEZE-OUT AS A REGULARIZER IN TRAINING NEURAL NETWORKS

(71) Applicant: GE Precision Healthcare LLC, Milwaukee, WI (US)

(72) Inventors: Tao Tan, Eindhoven (NL); Min Zhang, San Ramon, CA (US); Gopal Biligeri Avinash, San Ramon, CA (US); Lehel Ferenczi, Dunakeszi (HU); Levente Imre Török, Budapest (HU); Pál Tegzes, Budapest (HU)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 435 days.

(21) Appl. No.: 16/773,156

(22) Filed: Jan. 27, 2020

(65) Prior Publication Data

US 2021/0232909 A1    Jul. 29, 2021

(51) Int. Cl.
*G06N 3/08* (2006.01)
*G06N 20/00* (2019.01)
*G06N 3/04* (2006.01)

(52) U.S. Cl.
CPC ............ *G06N 3/08* (2013.01); *G06N 3/0472* (2013.01); *G06N 20/00* (2019.01)

(58) Field of Classification Search
CPC ........ G06N 3/08; G06N 3/0472; G06N 20/00; G06N 3/082; G06F 30/27
USPC .......................................................... 706/25
See application file for complete search history.

(56) References Cited

U.S. PATENT DOCUMENTS

| 9,406,017 | B2 | 8/2016 | Hinton et al. | |
|---|---|---|---|---|
| 2002/0010691 | A1* | 1/2002 | Chen | G06K 9/6278 706/20 |
| 2019/0244108 | A1* | 8/2019 | Meyerson | G06N 3/04 |
| 2020/0272899 | A1* | 8/2020 | Dunne | G06N 3/0454 |

OTHER PUBLICATIONS

Tan et al. "Optimize Transfer Learning for Lung Diseases in Bronchoscopy Using a New Concept: Sequential Fine-Tuning", IEEE J Transl Eng Health Med. Aug. 16, 2018;6:1800808. doi: 10.1109/JTEHM.2018.2865787. (8 pages).

Gupta, et al., "Train your Deep Learning Faster: FreezeOut" https://www.kdnuggets.com/2017/08/train-deep-learning-faster-freezeout.html (2017) 6 pages.

Arishanapally, Sai Charan "Building VGG19 with Keras", Oniline available at <https://saicharanars.medium.com/building-vgg19-with-keras-f516101c24cf>, published on Apr. 16, 2019, retrieved on Sep. 1, 2022, 6 pages.

\* cited by examiner

*Primary Examiner* — Paul Dinh
(74) *Attorney, Agent, or Firm* — Amin, Turocy & Watson, LLP

(57) ABSTRACT

Systems and techniques that facilitate freeze-out as a regularizer in training neural networks are presented. A system can include a memory and a processor that executes computer executable components. The computer executable components can include: an assessment component that identifies units of a neural network, a selection component that selects a subset of units of the neural network, and a freeze-out component that freezes the selected subset of units of the neural network so that weights of output connections from the frozen subset of units will not be updated for a training run.

20 Claims, 15 Drawing Sheets

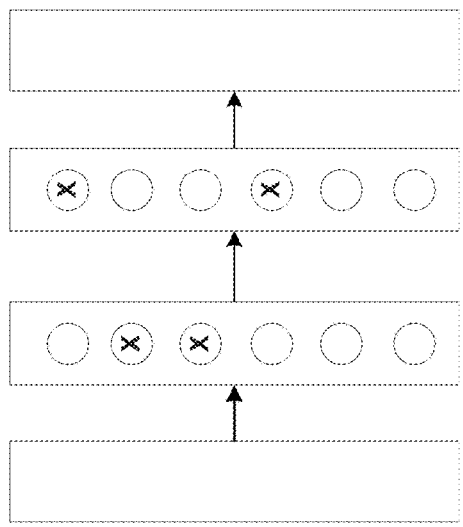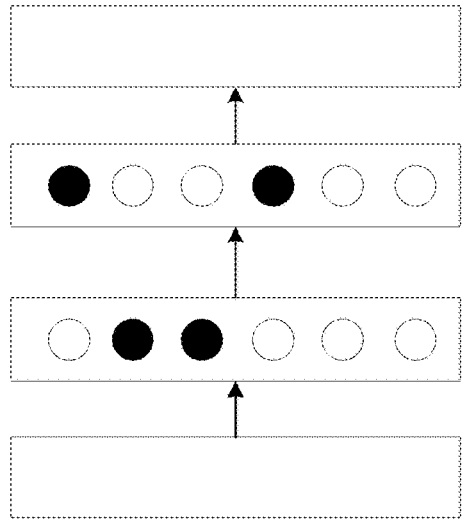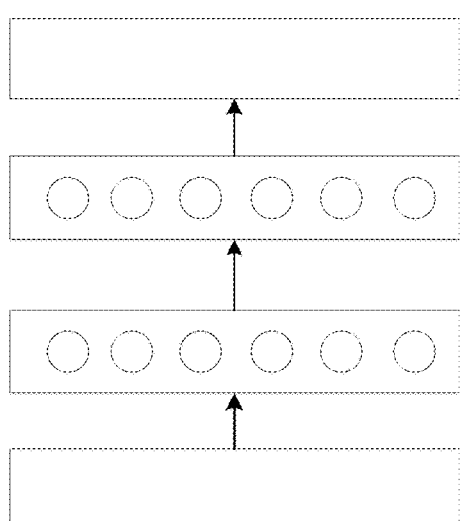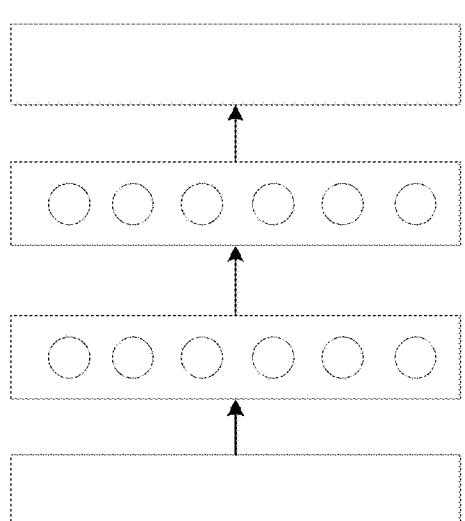

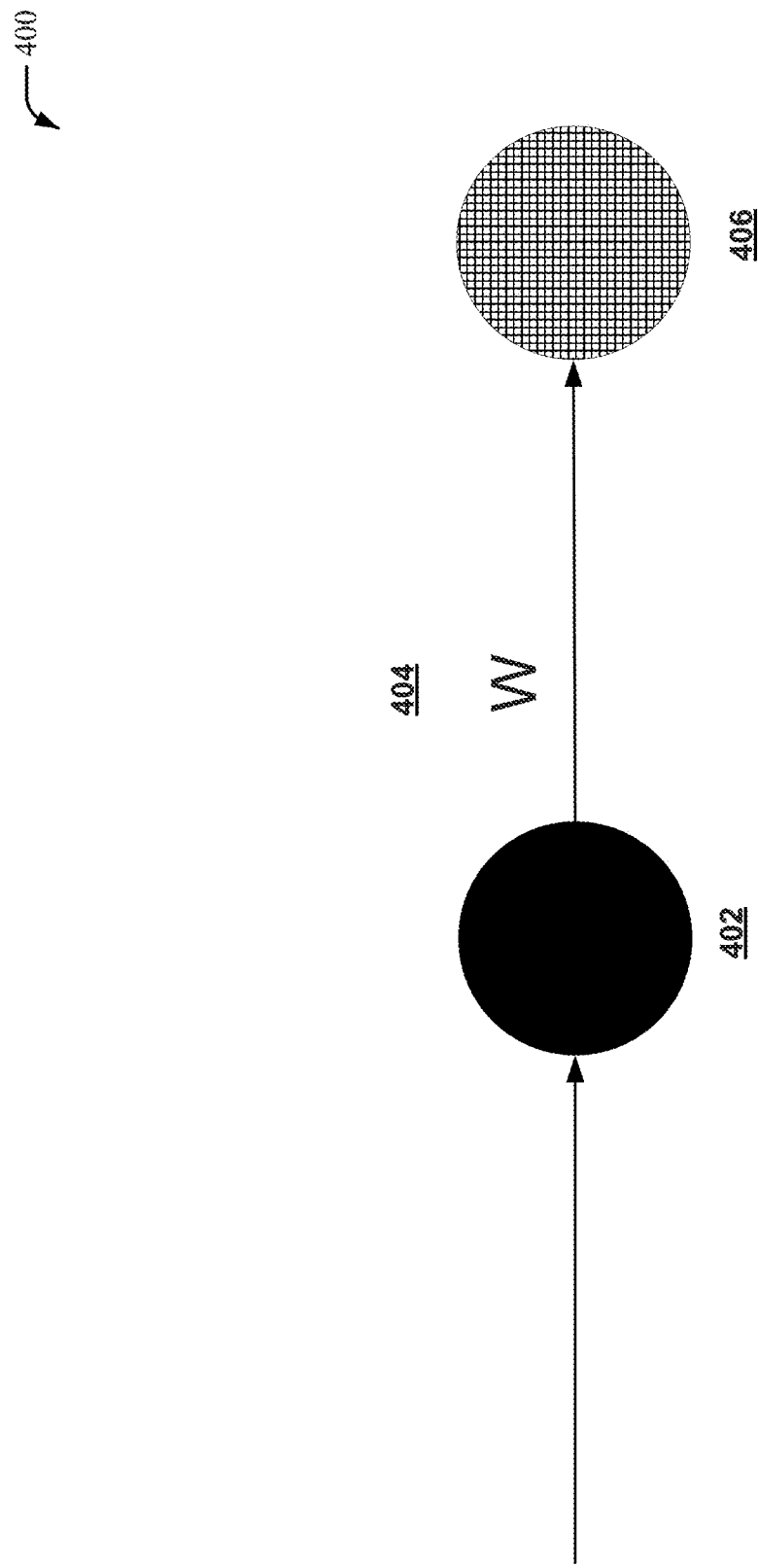

```
algorithm training with freezeout is
    input: a defined neural network NW, training data D, freezeout rate
r between 0 and 1, specified node set FN which can be frozen out,
learning rate η, a defined stop-criterion of training
    output: a trained network
    (Note that FN is a subset of all nodes in NW)

Initialize weights of NW
    while not stop-criterion do
        for each training iteration do
            Calculate training error E
            for each weight Wij of connection from node i to node j do
                if node i does not belong to FN do
                    $W_{ij} = W_{ij} - \eta \frac{\partial E}{\partial W_{ij}}$
                else do
                    Generate a random number f between 0 and 1
                    if f is smaller or equal to the freezeout rate r do
                        $W_{ij} = W_{ij}$
                    else do
                        $W_{ij} = W_{ij} - \eta \frac{\partial E}{\partial W_{ij}}$
```

(Note that freezeout concept can be applied to any parameter of the
neural network, even for parameters from convolution kernels and the
freezing time of the same nodes can be extended to more than one
iteration)

FIG. 7

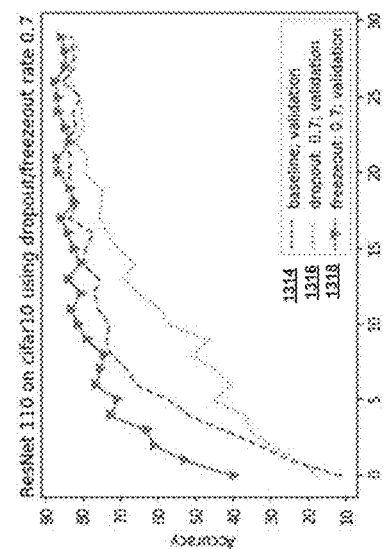
FIG. 13C
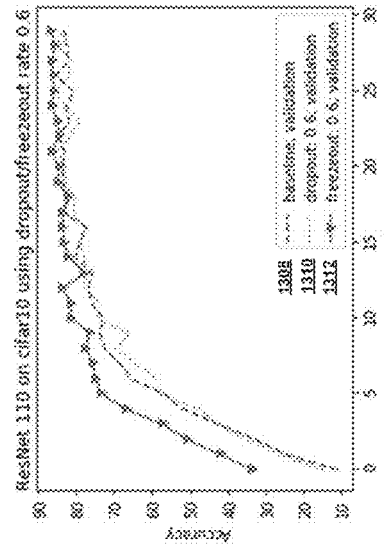
FIG. 13B
FIG. 13E
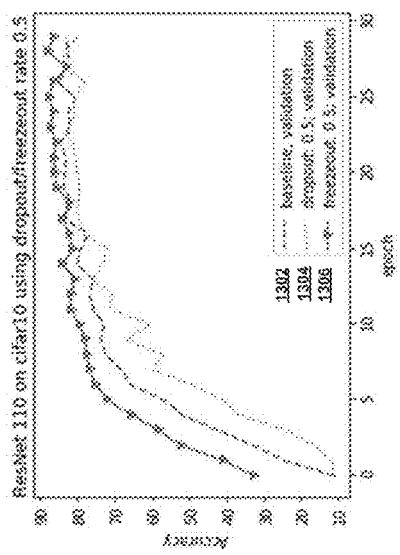
FIG. 13A
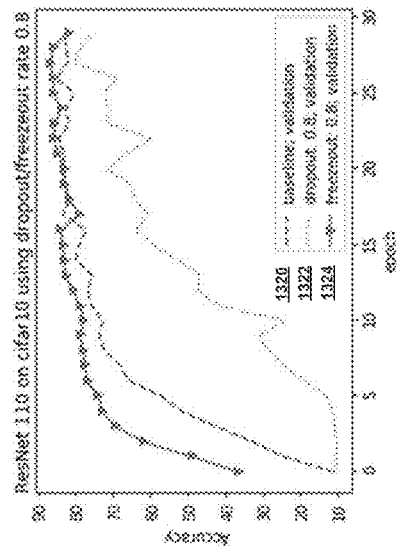
FIG. 13D

FREEZE-OUT AS A REGULARIZER IN TRAINING NEURAL NETWORKS

TECHNICAL FIELD

This disclosure relates generally to neural networks and more particularly to computer-implemented techniques for training neural networks.

BACKGROUND

When training neural networks, overfitting is a common problem. Overfitting occurs during the training process when the neural network model learns the training data too well, resulting in lower performance when the model is presented with new, unseen data. Overfitting can be detected by applying validation metrics such as accuracy to the new, unseen data (test data) and the training data. When overfitting occurs, validation metrics for test data stop improving after a certain number of epochs and begin to decrease afterward. Meanwhile, validation metrics for training data will continue to improve because the model seeks to find the best fit for the training data. The error associated with the training data is driven to a very small value, but when new data is presented to the neural network the error is large. The network has learned the training examples, but it has not learned to generalize to new situations or data sets.

Regularization refers to techniques to solve the overfitting problem by making slight modifications to the learning algorithm, enabling the neural network model to more accurately generalize to new situations or data sets. This in turn improves the model's performance on the new data as well.

Dropout refers to a regularization technique that randomly removes a certain percentage of hidden units (along with their connections) from a neural network layer during a training run (e.g., one or more training iterations). This prevents hidden units from relying too much on other hidden units. However, by dropping hidden units along with their connections, the architecture of the neural network changes for the applicable training run. Thus, it becomes necessary during each training run to update the weights of output connections from the dropped units to units of the following layer or layers.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

According to an embodiment, a system includes an assessment component, a selection component, and a freeze-out component. The assessment component identifies units of a neural network. The selection component selects a subset of units of the neural network. The freeze-out component freezes the selected subset of units of the neural network so that weights of output connections from the frozen subset of units will not be updated for a training run.

According to another embodiment, a method is provided. The method comprises identifying, by a device operatively coupled to a processor, units of a neural network. The method also comprises selecting, by the device, a subset of units of the neural network. Furthermore, the method comprises freezing, by the device, the selected subset of units of the neural network so that weights of output connections from the frozen subset of units will not be updated for a training run.

According to yet another embodiment, a computer readable storage device is provided. The computer readable storage device comprises instructions that, in response to execution, cause a system comprising a processor to perform operations, comprising identifying units of a neural network. The processor also performs operations, comprising selecting a subset of units of the neural network. The processor also performs operations, comprising freezing the selected subset of units of the neural network so that weights of output connections from the frozen subset of units will not be updated for a training run.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIGS. 2A-2D respectively illustrate an example of a non-limiting system that facilitates freeze-out as a regularizer in training neural networks in accordance with one or more embodiments described herein.

FIG. 4 illustrates another example of a non-limiting system that facilitates freeze-out as a regularizer in training neural networks in accordance with one or more embodiments described herein.

FIG. 7 illustrates another example algorithm that facilitates freeze-out as a regularizer in training neural networks in accordance with one or more embodiments described herein.

FIGS. 13A-13E respectively illustrate results of additional experiments utilizing freeze-out as a regularizer in training neural networks in accordance with one or more embodiments described herein.

DETAILED DESCRIPTION

Figure 1:
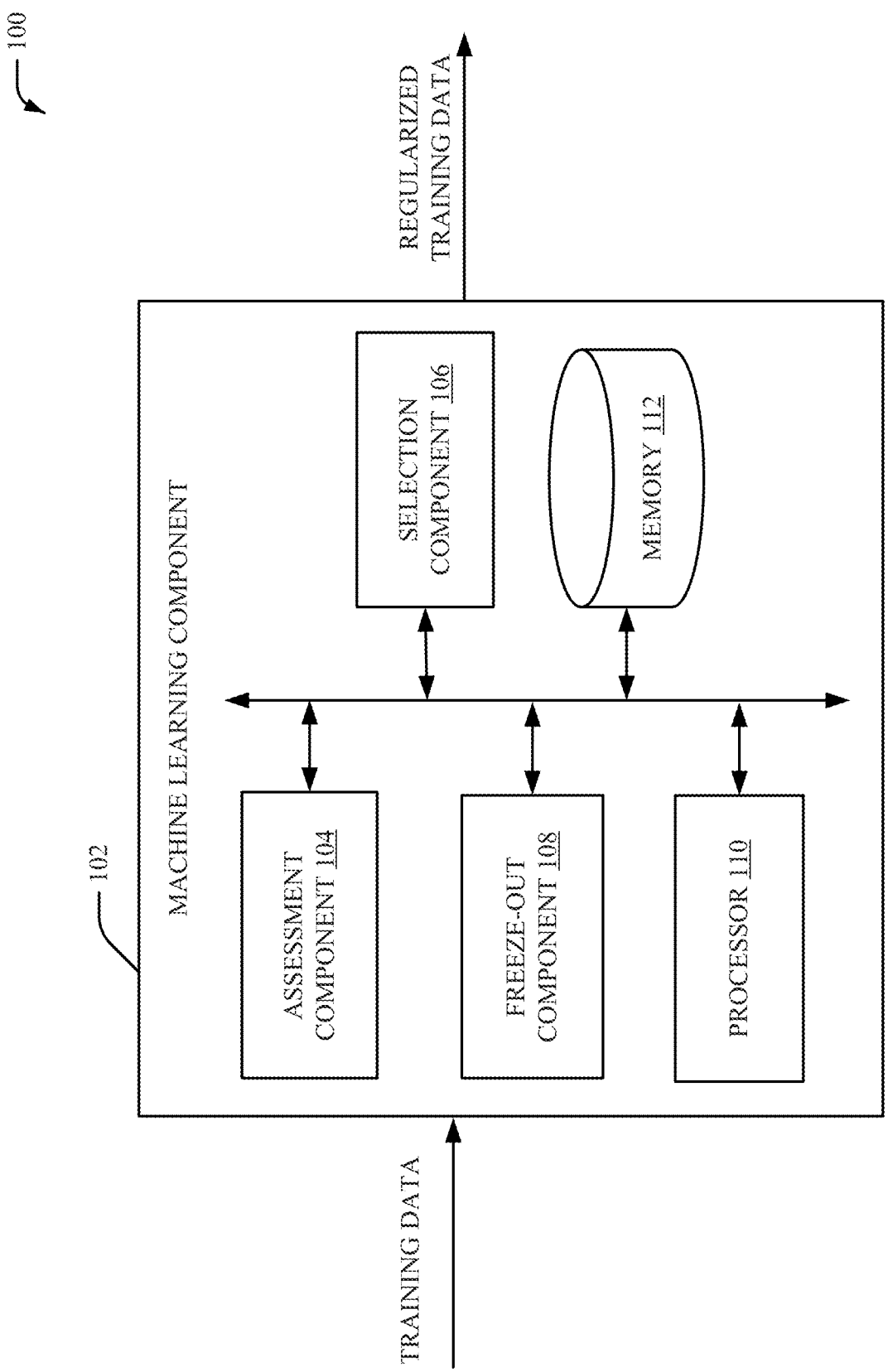
FIG. 1 illustrates a block diagram of an example, non-limiting system that facilitates freeze-out as a regularizer in training neural networks in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more embodiments.

Neural networks have become ubiquitous in fields such as medical imaging, machine vision, speech recognition, document classification and computational biology. Neural networks have some advantages that make them suitable for various problems and situations. For example, neural networks have the ability to learn and model non-linear and complex relationships. After learning from initial inputs and relationships, neural networks can infer unseen relationships on unseen data as well, thus affording for generalizing and predicting on unseen data. Neural networks can consume a high volume of inputs, and process them to infer hidden as well as complex, non-linear relationships.

Systems and techniques that facilitate freeze-out as a regularizer in training neural networks are presented. When training neural networks, overfitting is a common problem. Overfitting occurs during the training process when the neural network model learns the training data too well, resulting in lower performance when the model is presented with new, unseen data. Overfitting can be detected by applying validation metrics such as accuracy to the new, unseen data (test data) and the training data. When overfitting occurs, validation metrics for test data stop improving after a certain number of epochs and begin to decrease afterward. Meanwhile, validation metrics for training data will continue to improve because the model seeks to find the best fit for the training data. The error associated with the training data is driven to a very small value, but when new data is presented to the neural network the error is large. The network has learned the training examples, but it has not learned to generalize to new situations or data sets.

Regularization refers to techniques to solve the overfitting problem by making slight modifications to the learning algorithm, enabling the neural network model to more accurately generalize to new situations or data sets. This in turn improves the model's performance on the new data as well.

Dropout refers to a regularization technique that randomly removes a certain percentage of hidden units (along with their connections) from a neural network layer during a training run (e.g., one or more training iterations). This prevents hidden units from relying too much on other hidden units. However, by dropping hidden units along with their connections, the architecture of the neural network changes for the applicable training run. Thus, it becomes necessary during each training run to update the weights of output connections from the dropped units to units of the following layer or layers.

Freeze-out provides an improved regularization technique as it eliminates the need to update the weights of output connections. Instead of dropping or removing a certain percentage of the hidden units, the freeze-out technique involves randomly freezing a certain percentage of hidden units. However, with freeze-out, the connections of frozen units to units of the following layer or layers are not removed or changed. The output of frozen units is not included for a training run but the weights of output connections from the frozen units to units of the following layer or layers are not changed for the training run. Thus, there is no need to update the weights of output connections from the frozen units to units of the following layer or layers during each training run. With the dropout technique, units are removed for training and the architecture of the network is changed. With the freeze-out technique, units are frozen, not removed, and the architecture of the networks remains unchanged. This eliminates a step of updating weights of output connections from dropped units when utilizing dropout, resulting in a smooth, efficient and more accurate training process. Additionally, the reduction in steps and elimination of the need to update weights of output connections can reduce amount of time and effort required in training a neural network, thus optimizing training. Furthermore, the reduction of steps and elimination of need to update weights of output connections can mitigate reduction of errors as well as improve accuracy prediction by the neural network as evidenced by results of experiments shown in this specification below. Embodiments herein can facilitate automating training of neural networks through elimination of steps and reweighting associated with conventional techniques.

Referring initially to FIG. 1, there is illustrated an example system 100 to facilitate freeze-out as a regularizer in training neural networks. The system 100 can include a machine learning component 102 that can include an assessment component 104, a selection component 106, and a freeze-out component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the machine learning component 102) can include memory 112 for storing computer executable components and instructions. The system 100 (e.g., the machine learning component 102) can further include a processor 110 to facilitate operation of the instructions (e.g., computer executable components and instructions) by the system 100 (e.g., the machine learning component 102).

The machine learning component 102 can receive training data and generate regularized training data. In certain embodiments, the assessment component 104 can identify units of a neural network. In one example, the assessment component 104 can identify units of a neural network randomly. In another example, the assessment component 104 can identify units of a neural network randomly but with one or more pre-determined rules or parameters.

In certain embodiments, the selection component 106 can select a subset of units of the neural network. In one example, the selection component 106 can select a subset of units of the neural network randomly. In another example, the selection component 106 can select a subset of units of the neural network randomly but with one or more pre-determined rules or parameters. In another example, the selection component 106 can select a subset of units of the neural network comprising one or more entire layers of units. In another example, the selection component 106 can select a subset of units of the neural network comprising one or more blocks of layers of units.

In certain embodiments, the freeze-out component 108 can freeze the selected subset of units of the neural network so that weights of output connections from the frozen subset of units will not be updated for a training run. For example, when the freeze-out component 108 can freeze the selected subset of units of the neural network, the connections of frozen units to units of the following layer or layers are not removed or changed. The output of frozen units is not included for a training run but the weights of output connections from the frozen units to units of the following layer or layers are not changed for the training run. Thus, there is no need to update weights of output connections from frozen units to units of following layer(s) during each training run. When units are frozen by the freeze-out component 108 as opposed to being removed when utilizing dropout, the architecture of the neural network remains unchanged. This eliminates a step of updating the weights of output connections from dropped units when utilizing dropout. This results in a smoother, more efficient and more accurate training process.

In another example, the freeze-out component 108 freezes one or more layers of the neural network selected by the selection component 106 so that weights of output connections from the one or more frozen layers will not be updated for a training run. In another example, the freeze-out component 108 freezes one or more blocks of layers of the neural network selected by the selection component 106 so that weights of output connections from the one or more frozen blocks of layers will not be updated for a training run. In certain embodiments, the freezing out selected units of the neural network by the freeze-out component 108 can be performed in addition to dropping out another subset of units of the neural network.

It is to be appreciated that technical features of the machine learning component 102 are highly technical in nature and not abstract ideas. Processing threads of the machine learning component 102 that process and/or analyze the training data, generated regularized training data, etc. cannot be performed by a human (e.g., are greater than the capability of a single human mind). For example, the amount of the training data processed, the speed of processing of the training data and/or the data types of the training data processed by the machine learning component 102 over a certain period of time can be respectively greater, faster and different than the amount, speed and data type that can be processed by a single human mind over the same period of time. Furthermore, the training data processed by the machine learning component 102 can be one or more types of data (e.g., medical imaging, vision, speech recognition, document classification, computational biology . . . ). Moreover, the machine learning component 102 can be fully operational towards performing one or more other functions (e.g., fully powered on, fully executed, etc.) while also processing the training data.

FIGS. 2A-2D respectively illustrate an example of a non-limiting system that facilitates freeze-out as a regularizer in training neural networks in accordance with one or more embodiments described herein. Repetitive description of like elements employed in other embodiments described herein is omitted for sake of brevity. FIGS. 2A-2D respectively illustrate an example comparison between utilizing dropout and freeze-out techniques. FIG. 2A illustrates four layers of a neural network 202, 204, 206 and 208. FIG. 2B illustrates the same four layers of the neural network 210, 212, 214 and 216 with two units dropped in each of layers 212 and 214 during a training run utilizing dropout. The output of the dropped units is not included for the applicable training run. FIG. 2C illustrates four layers of a neural network 218, 220, 222 and 224. FIG. 2D illustrates the same four layers of the neural network 226, 228, 230 and 232 with two units dropped in each of layers 228 and 230 during a training run utilizing freeze-out. The output of the frozen units is not included for the applicable training run.

Figure 3B:
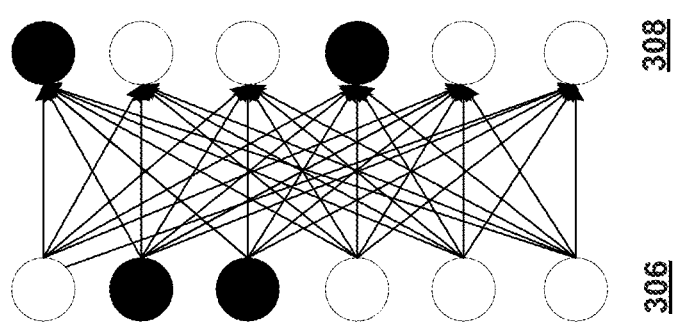
FIGS. 3A-3B respectively illustrate another example of a non-limiting system that facilitates freeze-out as a regularizer in training neural networks in accordance with one or more embodiments described herein.
Figure 3A:
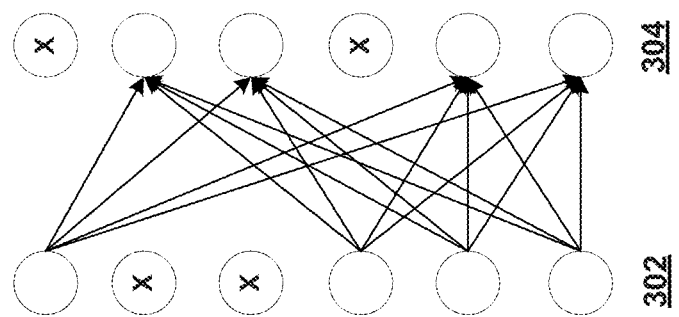

FIGS. 3A-3B respectively illustrate another example of a non-limiting system that facilitates freeze-out as a regularizer in training neural networks in accordance with one or more embodiments described herein. Repetitive description of like elements employed in other embodiments described herein is omitted for sake of brevity. FIGS. 3A-3B respectively illustrate an example comparison between utilizing dropout and freeze-out techniques. FIG. 3A illustrates two layers of a neural network with two units dropped in each of layers 302 and 304 during a training run utilizing dropout. By utilizing dropout, the connections of the dropped units to units in the following are also removed during the training run, as reflected in FIG. 3A. This requires that the weights of output connections from the dropped units to units of following layer during each training run be updated for each training run. FIG. 3B illustrates two layers of a neural network with two units frozen in each of layers 306 and 308 during a training run utilizing freeze-out. By utilizing freeze-out, the connections of the frozen units to units in the following are not removed during the training run, as reflected in FIG. 3B. Thus, it is not necessary to update the weights of output connections from the frozen units to units of following layer during each training run.

FIG. 4 illustrates another example of a non-limiting system that facilitates freeze-out as a regularizer in training neural networks in accordance with one or more embodiments described herein. Repetitive description of like elements employed in other embodiments described herein is omitted for sake of brevity. FIG. 4 illustrates the connection between a frozen unit 402 and a unit 406 in the next layer and w 404 representing the output weight. In this example, the input z of the next layer unit 406 from the frozen unit 404, $z=w*a$, where a represents the activation of the frozen unit 402 (which behaves in the same manner as a unit with unfrozen status) and w represents the output weight. The output weight w 404 is not updated during training if the associated unit 402 is frozen.

Figure 5:
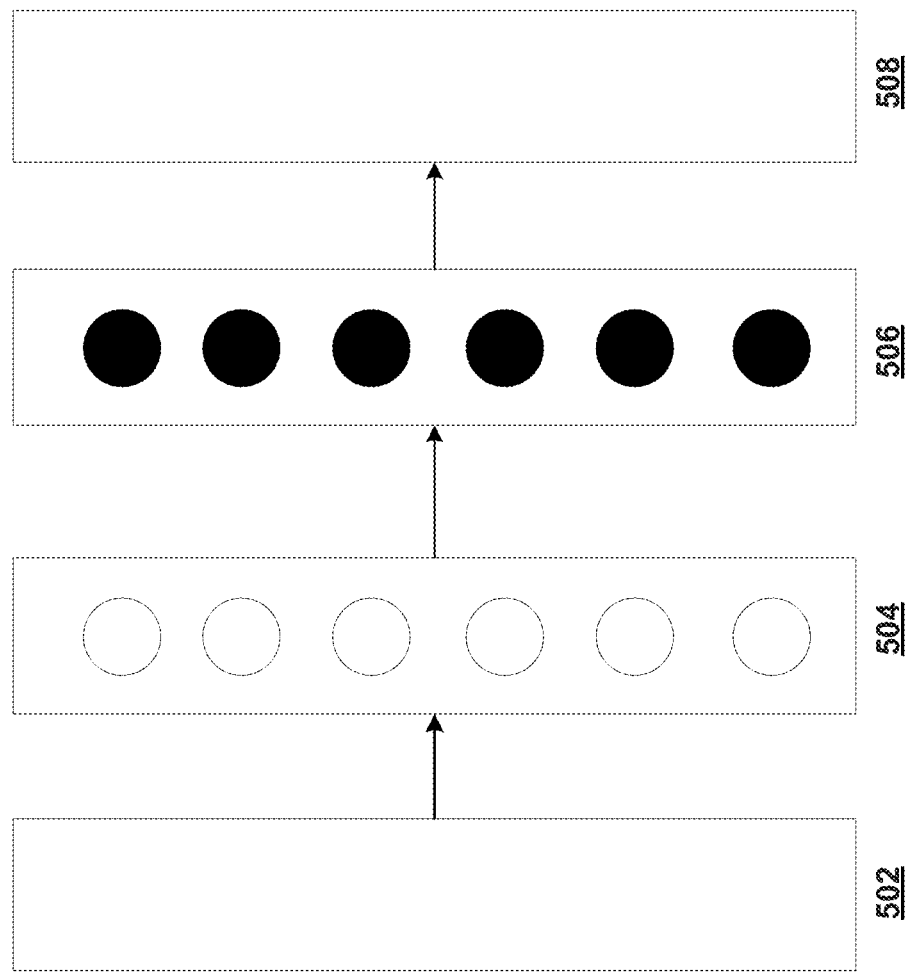
FIG. 5 illustrates another example of a non-limiting system that facilitates freeze-out as a regularizer in training neural networks in accordance with one or more embodiments described herein.

FIG. 5 illustrates another example of a non-limiting system that facilitates freeze-out as a regularizer in training neural networks in accordance with one or more embodiments described herein. Repetitive description of like elements employed in other embodiments described herein is omitted for sake of brevity. FIG. 5A illustrates four layers of a neural network 502, 504, 506 and 508. In this example, the entire layer 506 and all units therein are randomly frozen for a training run.

Figure 6:
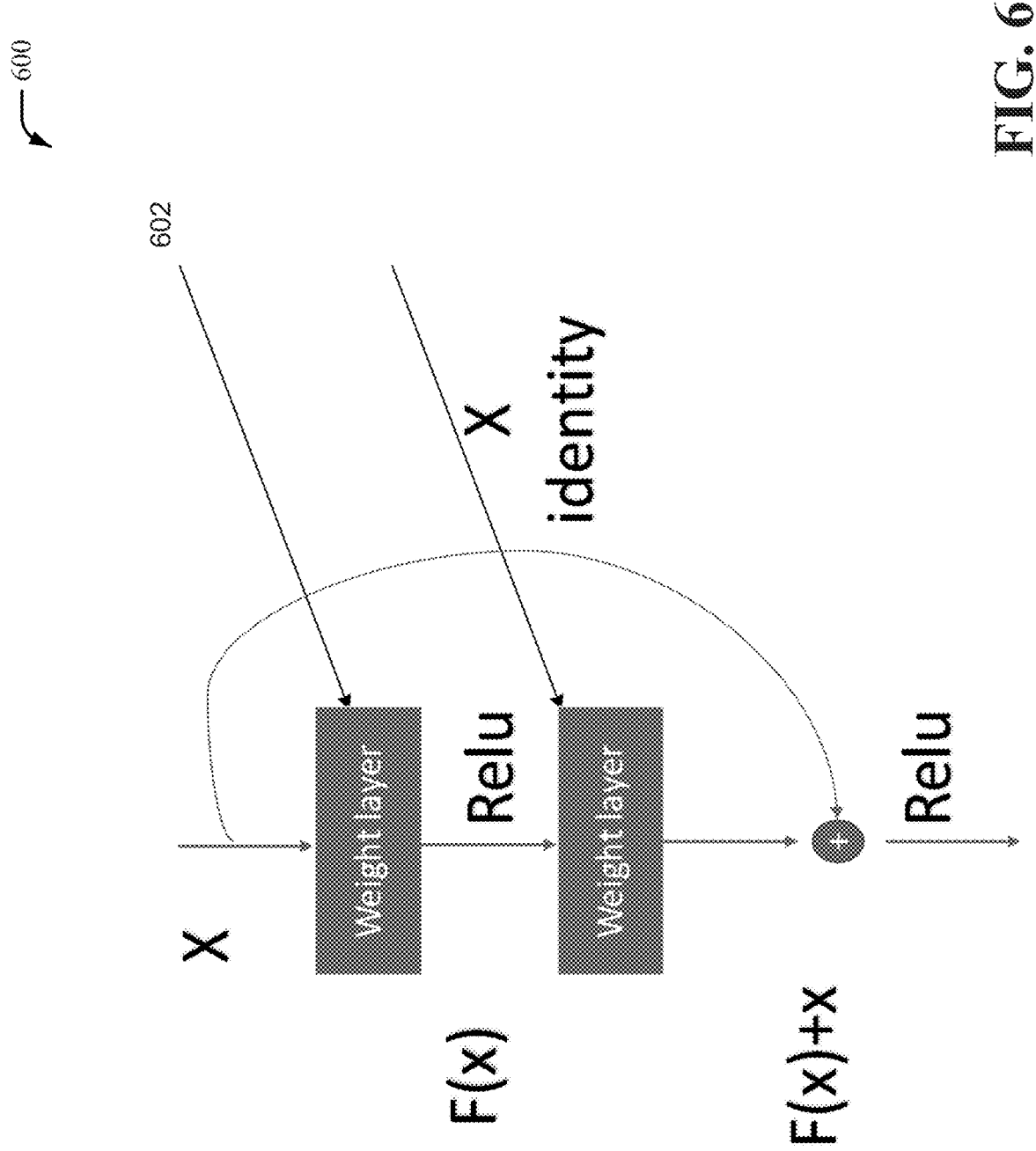
FIG. 6 illustrates an example algorithm that facilitates freeze-out as a regularizer in training neural networks in accordance with one or more embodiments described herein.

FIG. 6 illustrates an example training algorithm 600 that facilitates freeze-out as a regularizer in training neural networks in accordance with one or more embodiments described herein. Repetitive description of like elements employed in other embodiments described herein is omitted for sake of brevity. In accordance with certain embodiments described herein, example training algorithm 600, or the like, can facilitate freeze-out as a regularizer in training neural networks, either weight layer 602 or weight layer 604 can be frozen.

FIG. 7 illustrates a training algorithm that facilitates freeze-out as a regularizer in training neural networks in accordance with one or more embodiments described herein. Repetitive description of like elements employed in other embodiments described herein is omitted for sake of brevity. In accordance with certain embodiments described herein, the example training algorithm 700 can facilitate freeze-out as a regularizer in training neural networks utilizing inputs including a defined neural network NN, training data D, freeze-out rate r, specified node set FN which can be frozen out, learning rate n between 0 and 1 and a defined stop criterion of training.

Figure 8:
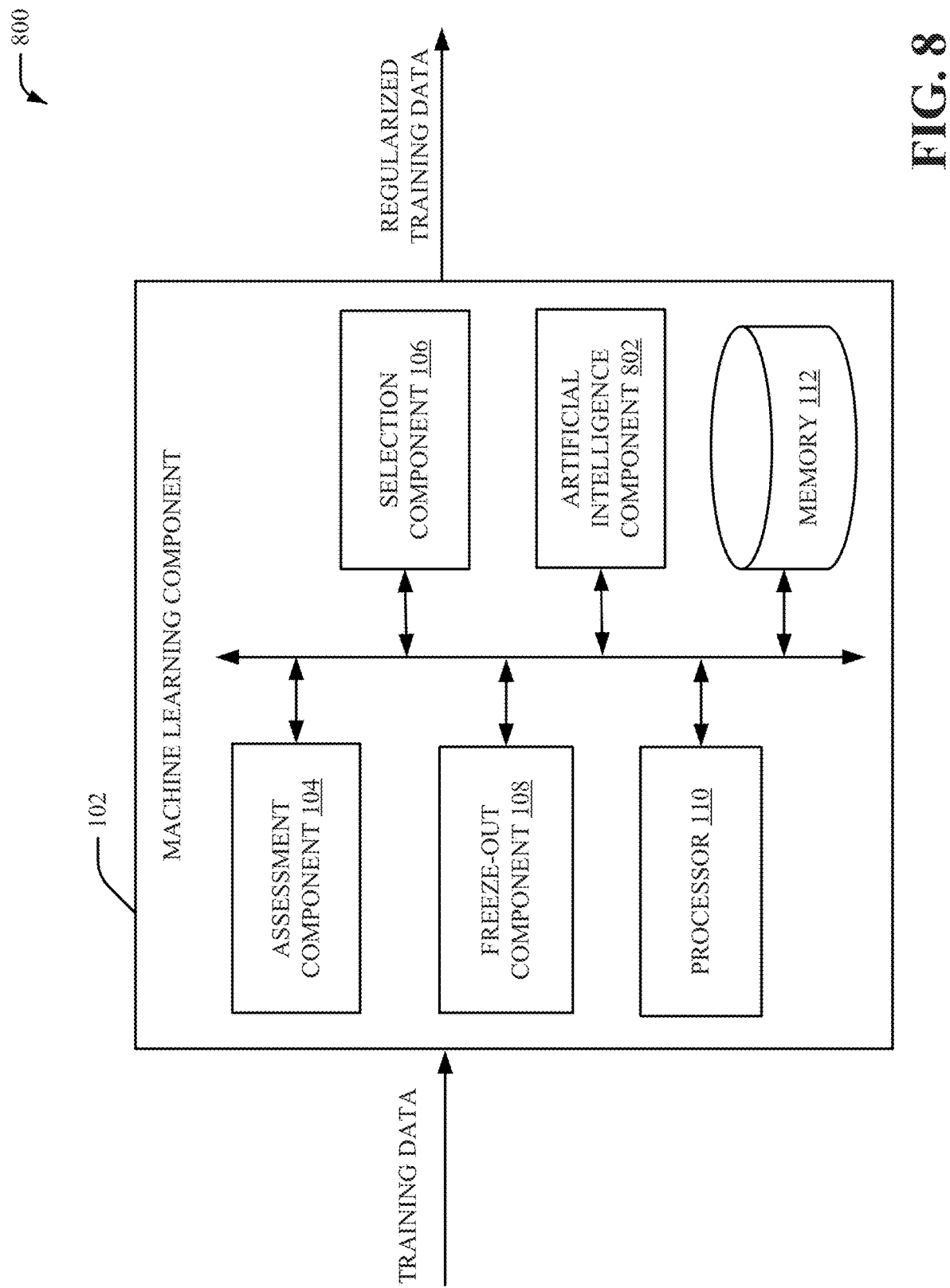
FIG. 8 illustrates a block diagram of yet another example, non-limiting system that facilitates freeze-out as a regularizer in training neural networks in accordance with one or more embodiments described herein.

FIG. 8 illustrates a block diagram of yet another example, non-limiting system that facilitates freeze-out as a regularizer in training neural networks in accordance with one or more embodiments described herein. Repetitive description of like elements employed in other embodiments described herein is omitted for sake of brevity. In certain embodiments, the system 800 includes an artificial intelligence component 802 can employ a machine learning model to facilitate selection of the subset of units by the selection component 106 to be frozen by the freeze-out component 108. For example, freeze-out can be utilized using random selection of units, subsets of units or layers of units to be frozen during a training run. The artificial intelligence component 802 can employ a machine learning model to enable the selection component 106 to utilize selection criteria to modify, supplement or replace random selection in order to improve the training process. For example, the artificial intelligence component 802 can detect patterns or correlations between or within certain types of data sets that affect the impact of freezing certain types of units on the training process. For example, the artificial intelligence component 802 can detect patterns or correlations that apply to medical imaging data but not speech recognition data. In another example, the artificial intelligence component 802 the most likely number of epochs during training for particular types of data sets that will optimize performance of the trained neural network on test data.

In this regard, the artificial intelligence component 802 can perform classifications, correlations, inferences and/or expressions associated with principles of artificial intelligence. For instance, the artificial intelligence component 802 can employ an automatic classification system and/or an automatic classification. In one example, the artificial intelligence component 802 can employ a probabilistic and/or statistical-based analysis (e.g., factoring into the analysis utilities and costs) to learn and/or generate inferences. The artificial intelligence component 802 can employ any suitable machine-learning based techniques, statistical-based techniques and/or probabilistic-based techniques. For example, the artificial intelligence component 802 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 802 can perform a set of machine learning computations. For example, the artificial intelligence component 802 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 9:
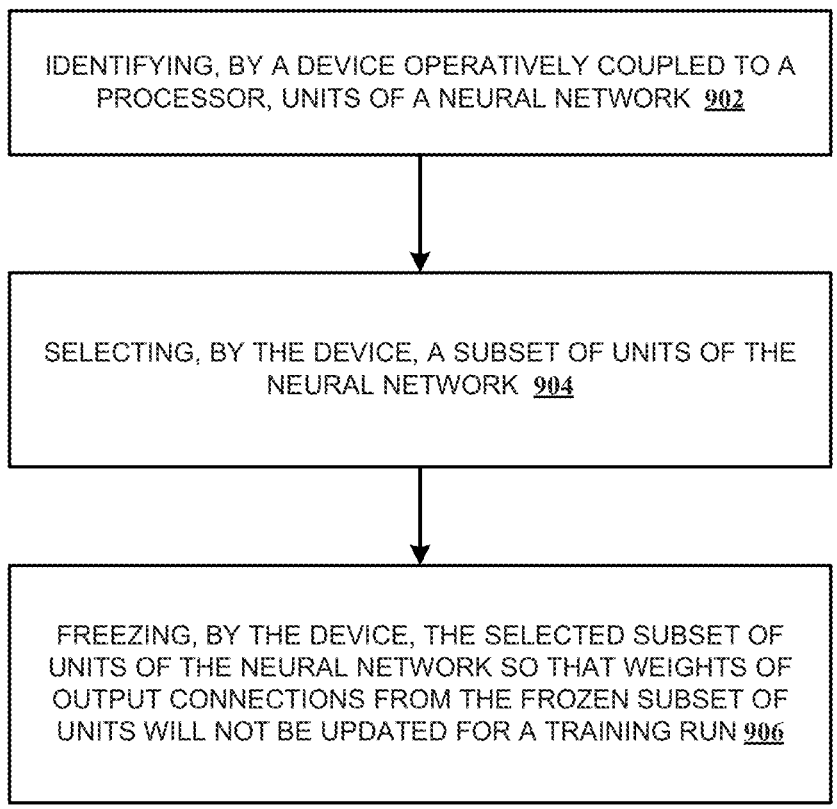
FIG. 9 illustrates a flow diagram of an example of a method to facilitate freeze-out as a regularizer in training neural networks in accordance with one or more embodiments described herein.

FIG. 9 illustrates a flow diagram of an example of a method to facilitate freeze-out as a regularizer in training neural networks in accordance with one or more embodiments described herein. Repetitive description of like elements employed in other embodiments described herein is omitted for sake of brevity. Block 902 represents a first act that includes identifying units of a neural network (e.g., via the assessment component 104). At 904, a subset of units of the neural network are selected (e.g., via the selection component 106). At 906, the selected subset of units of the neural network are frozen so that weights of output connections from the frozen subset of units will not be updated for a training run (e.g., via the freeze-out component 108). In certain embodiments, at 904, the artificial intelligence component 802 facilitates the selection of a subset of units of the neural network.

Figure 10:
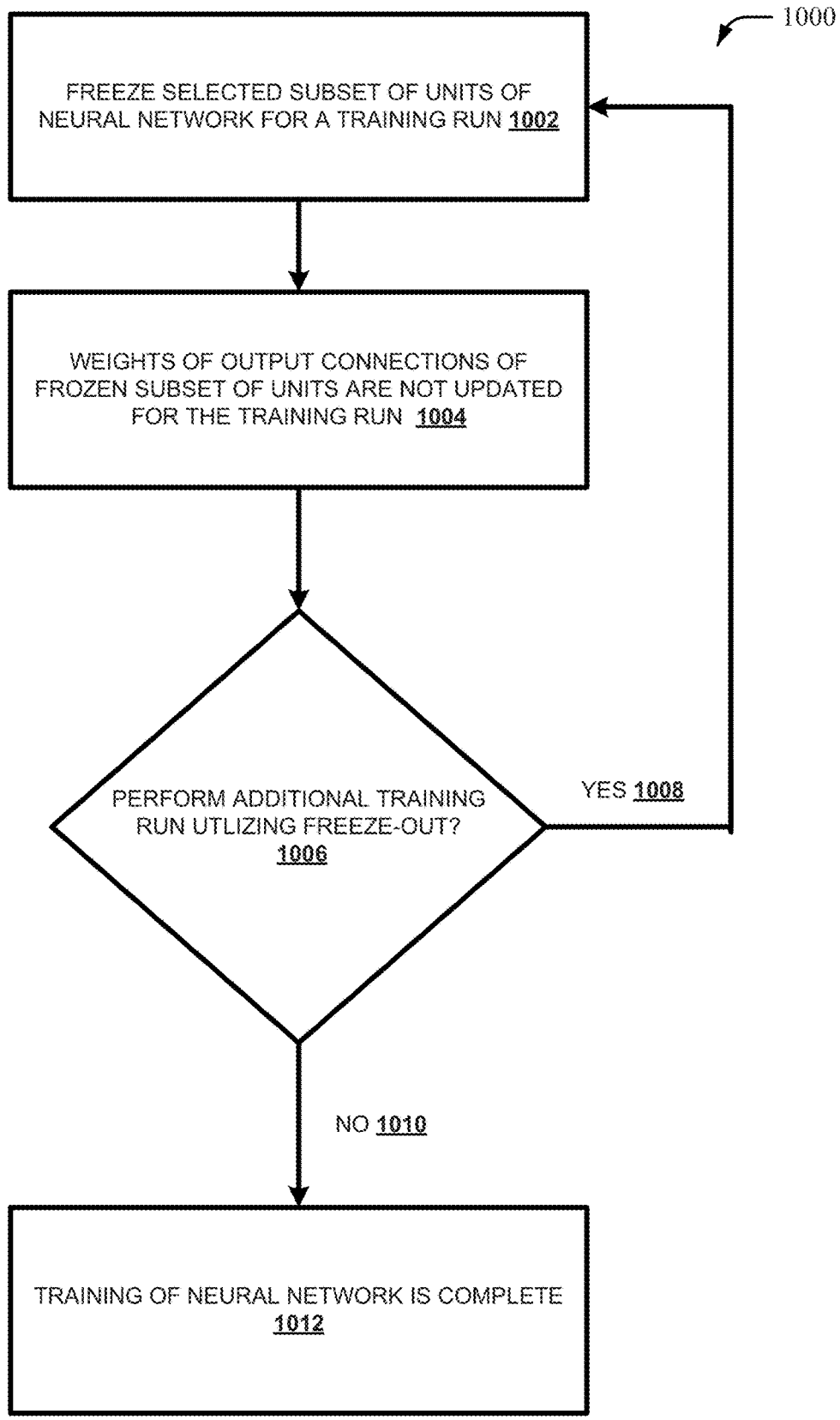
FIG. 10 illustrates a flow diagram of another example of a method to facilitate freeze-out as a regularizer in training neural networks in accordance with one or more embodiments described herein.
Figure 11C:
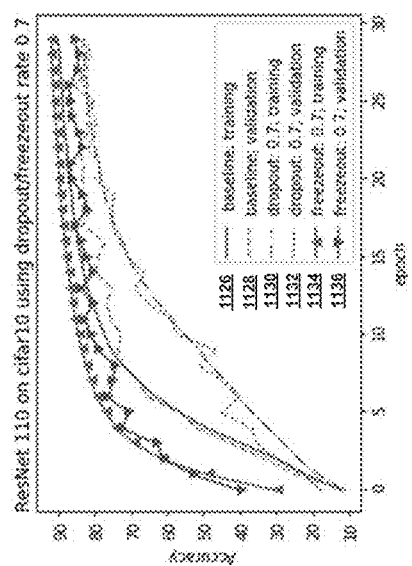
FIGS. 11A-11E respectively illustrate results of experiments utilizing freeze-out as a regularizer in training neural networks in accordance with one or more embodiments described herein.
Figure 11B:
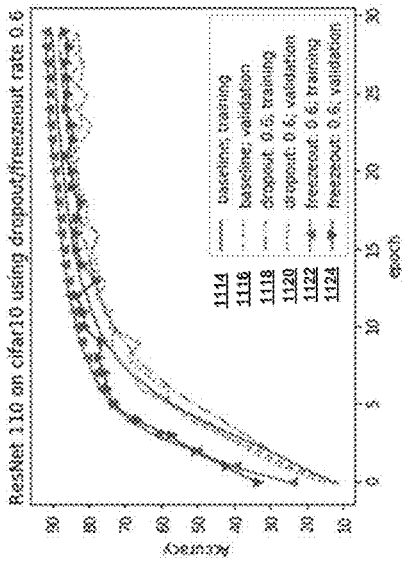
Figure 11E:
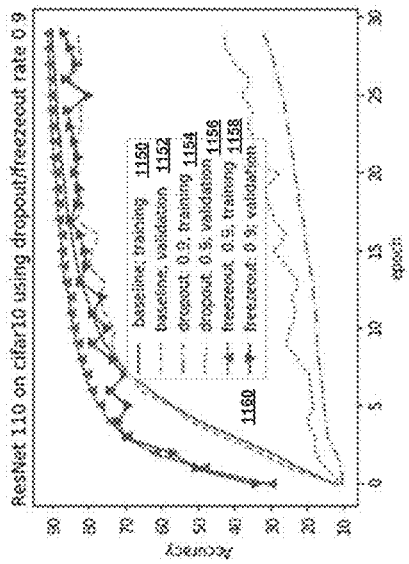
Figure 11A:
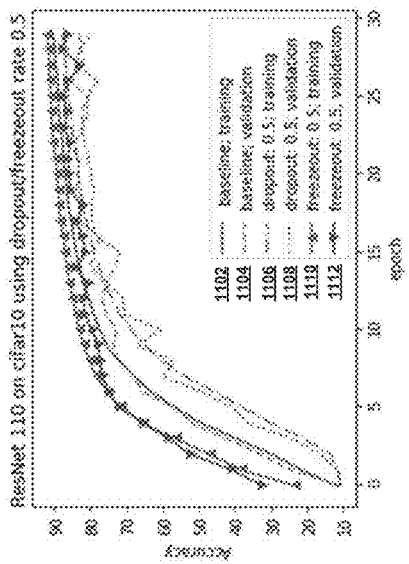
Figure 11D:
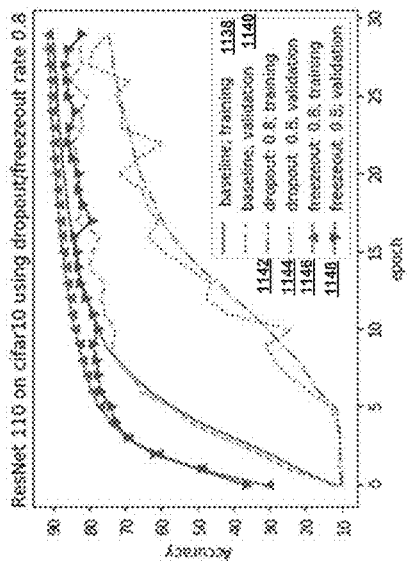
Figure 12C:
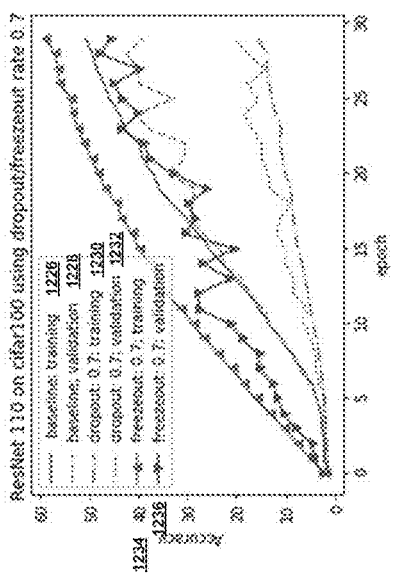
FIGS. 12A-12E respectively illustrate results of additional experiments utilizing freeze-out as a regularizer in training neural networks in accordance with one or more embodiments described herein.
Figure 12B:
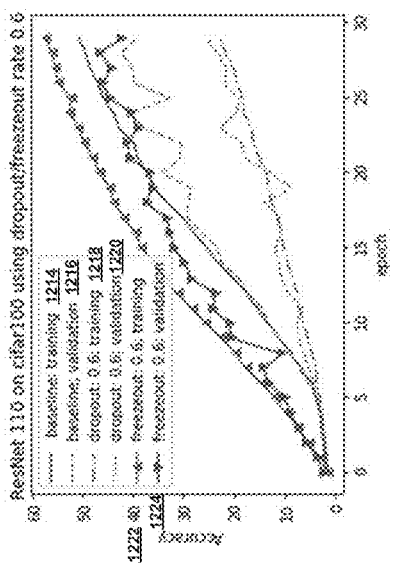
Figure 12E:
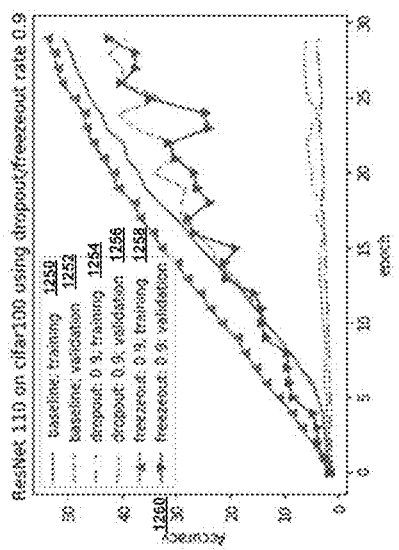
Figure 12A:
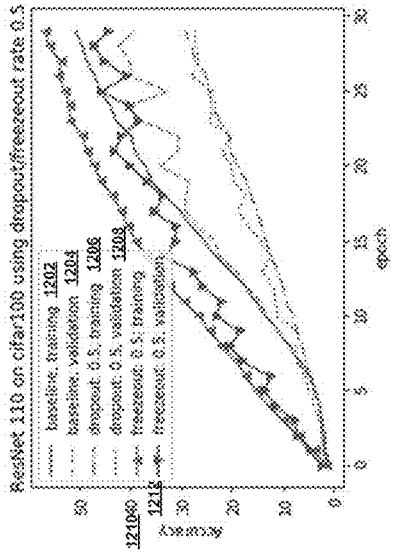
Figure 12D:
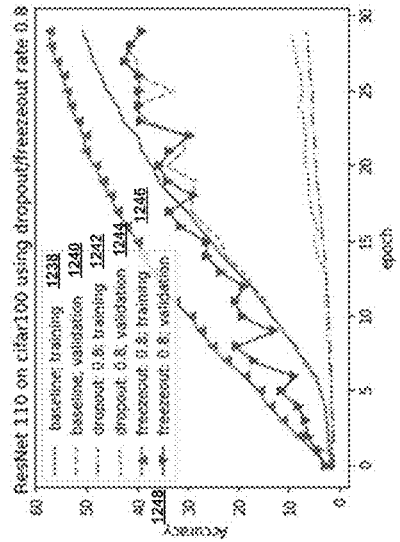
Figure 14C:
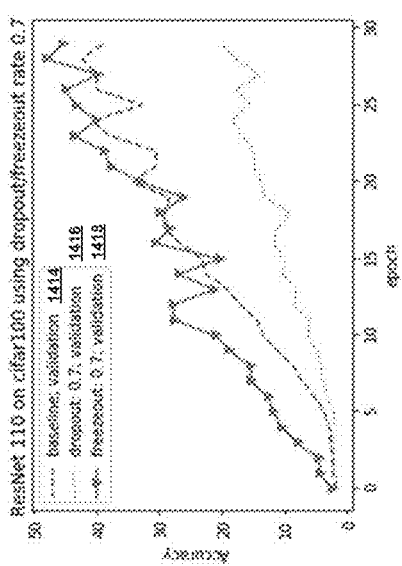
FIGS. 14A-14E respectively illustrate results of additional experiments utilizing freeze-out as a regularizer in training neural networks in accordance with one or more embodiments described herein.
Figure 14B:
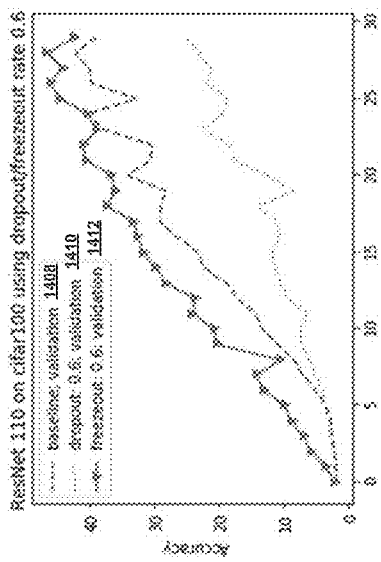
Figure 14E:
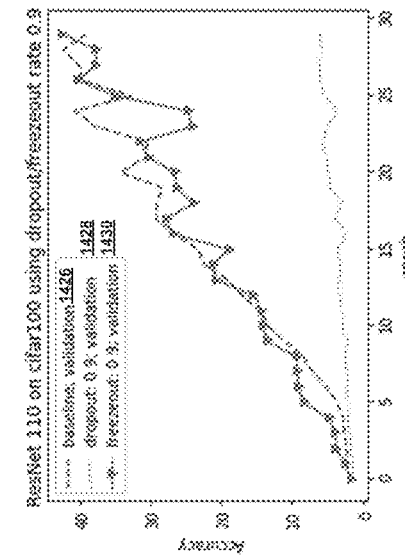
Figure 14A:
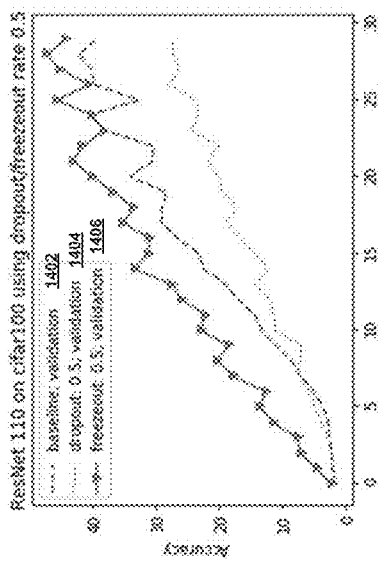
Figure 14D:
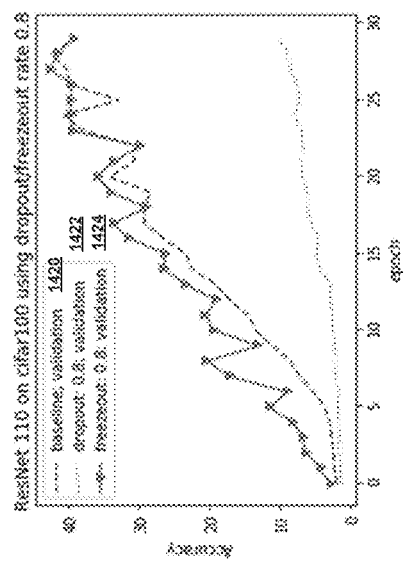

FIG. 10 illustrates a flow diagram of another example of a method to facilitate freeze-out as a regularizer in training neural networks in accordance with one or more embodiments described herein. Repetitive description of like elements employed in other embodiments described herein is omitted for sake of brevity. The method to facilitate freeze-out as a regularizer in training neural networks illustrated in FIG. 10 can be implemented in the system 100 of FIG. 1. As such, reference is to be made to the example of FIG. 1 in the following discussion of the example of FIG. 10.

Thus, in the example of FIG. 10, a sequence to facilitate freeze-out as a regularizer in training neural networks 1000 is outlined. The sequence begins at 1002 where a selected subset of units of a neural network are frozen for a training run. At 1004, the weights of output connections of the frozen subset of units are not updated for the training run. At 1006, it is determined if an additional training run utilizing freeze-out will be performed. If it is determined that another training run utilizing freeze-out will be performed 1008, the sequence repeats beginning at 1002. If it is determined that another training run utilizing freeze-out will not be performed 1010, then the training of the neural network is complete 1012.

FIGS. 11A-11E respectively illustrate results of experiments utilizing freeze-out as a regularizer in training neural networks in accordance with one or more embodiments described herein. Each of FIGS. 11A-11E comprises a graph plotting accuracy against number of epochs used in training a neural network. Each graph depicted in FIGS. 11A-11E respectively illustrates results including baseline results with training data and test (validation) data, baseline and validation results with dropout utilized as a regularizer, and baseline and validation results with freeze-out utilized as a regularizer. In each example depicted in FIGS. 11A-11E respectively, utilization of freeze-out as a regularizer results in higher accuracy in substantially all instances when compared to utilization of dropout as a regularizer. In the example represented by FIG. 11A, the dropout/freeze-out rate is 0.5. The graph in FIG. 11A includes results for baseline training 1102, baseline validation 1104, dropout 0.5 training 1106, dropout 0.5 validation 1108, freeze-out 0.5 training 1110 and freeze-out 0.5 validation 1112. In the example represented by FIG. 11B, the dropout/freeze-out rate is 0.6. The graph in FIG. 11B includes results for baseline training 1114, baseline validation 1116, dropout 0.6 training 1118, dropout 0.6 validation 1120, freeze-out 0.6 training 1122 and freeze-out 0.6 validation 1124. In the example represented by FIG. 11C, the dropout/freeze-out rate is 0.7. The graph in FIG. 11C includes results for baseline training 1126, baseline validation 1128, dropout 0.7 training 1130, dropout 0.7 validation 1132, freeze-out 0.7 training 1134 and freeze-out 0.7 validation 1136. In the example represented by FIG. 11D, the dropout/freeze-out rate is 0.8. The graph in FIG. 11D includes results for baseline training 1138, baseline validation 1140, dropout 0.8 training 1142, dropout 0.8 validation 1144, freeze-out 0.8 training 1146 and freeze-out 0.8 validation 1148. In the example represented by FIG. 11E, the dropout/freeze-out rate is 0.9. The graph in FIG. 11E includes results for baseline training 1150, baseline validation 1152, dropout 0.9 training 1154, dropout 0.9 validation 1156, freeze-out 0.9 training 1158 and freeze-out 0.9 validation 1160.

FIGS. 12A-12E respectively illustrate results of additional experiments utilizing freeze-out as a regularizer in training neural networks in accordance with one or more embodiments described herein. Each of FIGS. 12A-12E comprises a graph plotting accuracy against number of epochs used in training a neural network. Each graph depicted in FIGS. 12A-12E respectively illustrates results including baseline results with training data and test (validation) data, baseline and validation results with dropout utilized as a regularizer, and baseline and validation results with freeze-out utilized as a regularizer. In each example depicted in FIGS. 12A-12E respectively, utilization of freeze-out as a regularizer results in higher accuracy in substantially all instances when compared to utilization of dropout as a regularizer. In the example represented by FIG. 12A, the dropout/freeze-out rate is 0.5. The graph in FIG. 12A includes results for baseline training 1202, baseline validation 1204, dropout 0.5 training 1206, dropout 0.5 validation 1208, freeze-out 0.5 training 1210 and freeze-out 0.5 validation 1212. In the example represented by FIG. 12B, the dropout/freeze-out rate is 0.6. The graph in FIG. 12B includes results for baseline training 1214, baseline validation 1216, dropout 0.6 training 1218, dropout 0.6 validation 1220, freeze-out 0.6 training 1222 and freeze-out 0.6 validation 1224. In the example represented by FIG. 12C, the dropout/freeze-out rate is 0.7. The graph in FIG. 12C includes results for baseline training 1226, baseline validation 1228, dropout 0.7 training 1230, dropout 0.7 validation 1232, freeze-out 0.7 training 1234 and freeze-out 0.7 validation 1236. In the example represented by FIG. 12D, the dropout/freeze-out rate is 0.8. The graph in FIG. 12D includes results for baseline training 1238, baseline validation 1240, dropout 0.8 training 1242, dropout 0.8 validation 1244, freeze-out 0.8 training 1246 and freeze-out 0.8 validation 1248. In the example represented by FIG. 12E, the dropout/freeze-out rate is 0.9. The graph in FIG. 12E includes results for baseline training 1250, baseline validation 1252, dropout 0.9 training 1254, dropout 0.9 validation 1256, freeze-out 0.9 training 1258 and freeze-out 0.9 validation 1260.

FIGS. 13A-13E respectively illustrate results of additional experiments utilizing freeze-out as a regularizer in training neural networks in accordance with one or more embodiments described herein. Each of FIGS. 13A-13E comprises a graph plotting accuracy against number of epochs used in training a neural network. Each graph depicted in FIGS. 13A-13E respectively illustrates results including baseline results with test (validation) data, validation results with dropout utilized as a regularizer, and validation results with freeze-out utilized as a regularizer. In each example depicted in FIGS. 13A-13E respectively, utilization of freeze-out as a regularizer results in higher accuracy in substantially all instances when compared to utilization of dropout as a regularizer. In the example represented by FIG. 13A, the dropout/freeze-out rate is 0.5. The graph in FIG. 13A includes results for baseline validation 1302, dropout 0.5 validation 1304 and freeze-out 0.5 validation 1306. In the example represented by FIG. 13B, the dropout/freeze-out rate is 0.6. The graph in FIG. 13B includes results for baseline validation 1308, dropout 0.6 validation 1310 and freeze-out 0.6 validation 1312. In the example represented by FIG. 13C, the dropout/freeze-out rate is 0.7. The graph in FIG. 13C includes results for baseline validation 1314, dropout 0.7 validation 1316 and freeze-out 0.7 validation 1318. In the example represented by FIG. 13D, the dropout/freeze-out rate is 0.8. The graph in FIG. 13D includes results for baseline validation 1320, dropout 0.8 validation 1322 and freeze-out 0.8 validation 1324. In the example represented by FIG. 13E, the dropout/freeze-out rate is 0.9. The graph in FIG. 13E includes results for baseline validation 1326, dropout 0.9 validation 1328 and freeze-out 0.9 validation 1330.

FIGS. 14A-14E respectively illustrate results of additional experiments utilizing freeze-out as a regularizer in training neural networks in accordance with one or more embodiments described herein. Each of FIGS. 14A-14E comprises a graph plotting accuracy against number of epochs used in training a neural network. Each graph depicted in FIGS. 14A-14E respectively illustrates results including baseline results with test (validation) data, validation results with dropout utilized as a regularizer, and validation results with freeze-out utilized as a regularizer. In each example depicted in FIGS. 14A-14E respectively, utilization of freeze-out as a regularizer results in higher accuracy in substantially all instances when compared to utilization of dropout as a regularizer. In the example represented by FIG. 14A, the dropout/freeze-out rate is 0.5. The graph in FIG. 14A includes results for baseline validation 1402, dropout 0.5 validation 1404 and freeze-out 0.5 validation 1406. In the example represented by FIG. 14B, the dropout/freeze-out rate is 0.6. The graph in FIG. 14B includes results for baseline validation 1408, dropout 0.6 validation 1410 and freeze-out 0.6 validation 1412. In the example represented by FIG. 14C, the dropout/freeze-out rate is 0.7. The graph in FIG. 14C includes results for baseline validation 1414, dropout 0.7 validation 1416 and freeze-out 0.7 validation 1418. In the example represented by FIG. 14D, the dropout/freeze-out rate is 0.8. The graph in FIG. 14D includes results for baseline validation 1420, dropout 0.8 validation 1422 and freeze-out 0.8 validation 1424. In the example represented by FIG. 14E, the dropout/freeze-out rate is 0.9. The graph in FIG. 14E includes results for baseline validation 1426, dropout 0.9 validation 1428 and freeze-out 0.9 validation 1430.

Figure 15:
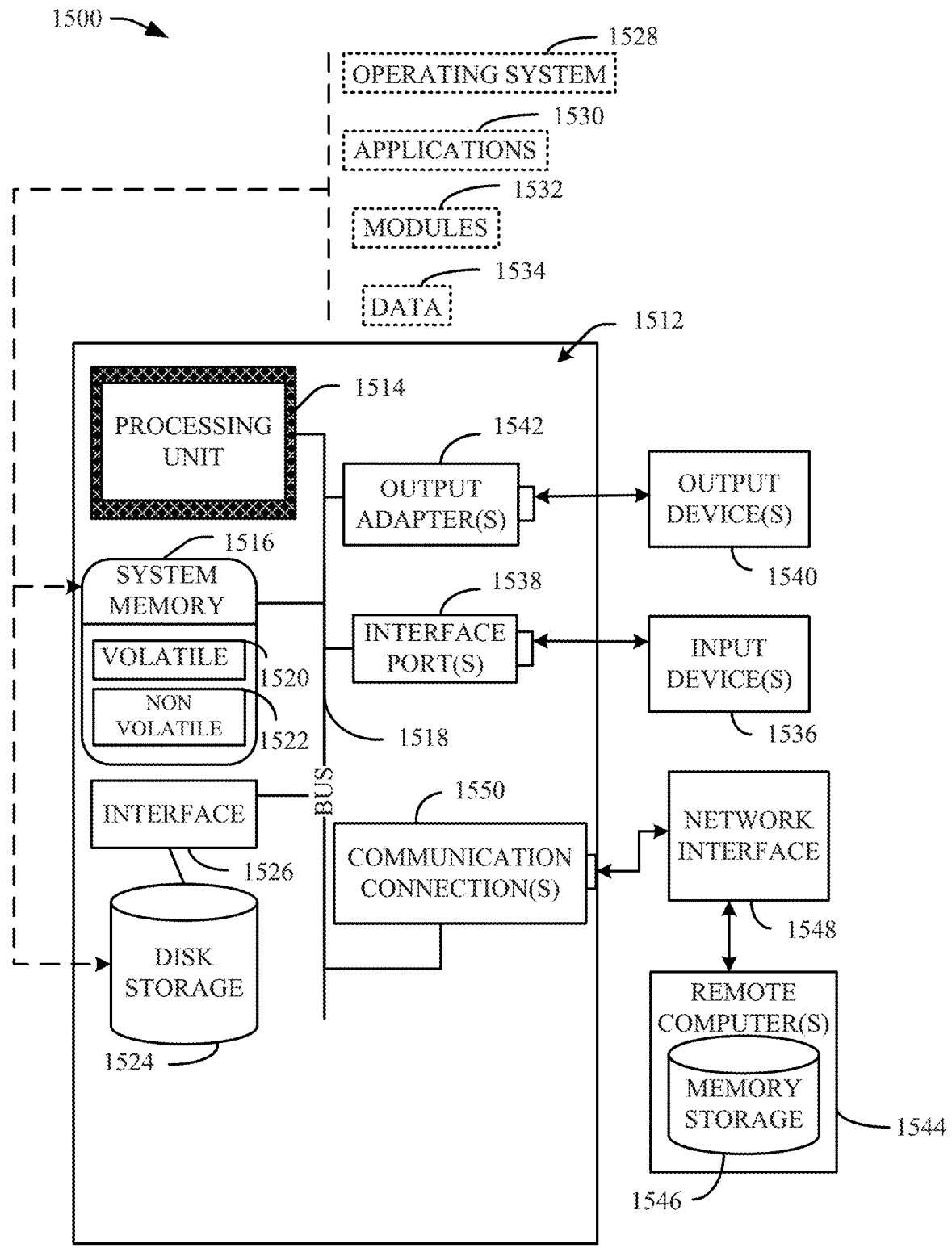
FIG. 15 is a schematic block diagram illustrating a suitable operating environment.

In order to provide a context for the various aspects of the disclosed subject matter, FIG. 15 as well as the following discussion are intended to provide a brief, general description of a suitable environment in which the various aspects of the disclosed subject matter may be implemented.

With reference to FIG. 15, a suitable environment 1500 for implementing various aspects of this disclosure includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 also includes removable/non-removable, volatile/nonvolatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

FIG. 15 also depicts software that acts as an intermediary between users and the basic computer resources described in the suitable operating environment 1500. Such software includes, for example, an operating system 1528. Operating system 1528, which can be stored on disk storage 1524, acts to control and allocate resources of the computer system 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/ software necessary for connection to the network interface 1548 includes, for exemplary purposes only, internal and external technologies such as, modems including regular telephone grade modems, cable modems and DSL modems, ISDN adapters, and Ethernet cards.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory that stores computer executable components; and
   a processor that executes computer executable components stored in the memory, wherein the computer executable components comprise:
   an assessment component that identifies units of a neural network;
   a selection component that selects a random subset of units of the neural network; and
   a freeze-out component that freezes the selected subset of units of the neural network so that weights of output connections from the frozen subset of units will not be updated for a training run;
   wherein the freezing out of the selected subset of units of the neural network is performed in lieu of dropping out the selected units such that architecture of the neural network remains unchanged.

2. The system of claim 1, wherein the selection component selects a layer of the neural network, and the freeze-out component freezes the selected layer of the neural network so that weights of output connections from the frozen layer will not be updated for a training run.

3. The system of claim 2, wherein freezing the selected layer of the neural network causes architecture of the neural network to remain unchanged during training runs.

4. The system of claim 2, wherein the freezing of the selected subset of units reduces dependence of the neural network on the frozen subset of units or layer.

5. The system of claim 2, wherein the freezing of the selected subset of units mitigates overfitting of the neural network on the frozen subset of units or layer.

6. The system of claim 2, wherein the selection component selects a block of layers of the neural network, and the freeze-out component freezes the selected block of layers of the neural network so that weights of output connections from the frozen block of layers will not be updated for a training run.

7. The system of claim 1, further comprising an artificial intelligence component that facilitates selection of the subset of units.

8. A method, comprising:
   identifying, by a system comprising a processor, units of a neural network;
   selecting, by the system, a random subset of units of the neural network; and
   freezing, by the system, the selected subset of units of the neural network so that weights of output connections from the frozen subset of units will not be updated for a training run;
   wherein the freezing out of the selected subset of units of the neural network is performed in lieu of dropping out the selected units such that architecture of the neural network remains unchanged.

9. The method of claim 8, further comprising selecting, by the system, a layer of the neural network, and freezing the selected layer of the neural network so that weights of output connections from the frozen layer will not be updated for a training run.

10. The method of claim 9, wherein freezing the selected layer of the neural network causes architecture of the neural network to remain unchanged during training runs.

11. The method of claim 9, wherein the freezing of the selected subset of units reduces dependence of the neural network on the frozen subset of units or layer.

12. The method of claim 9, wherein the freezing of the selected subset of units mitigates overfitting of the neural network on the frozen subset of units or layer.

13. The method of claim 8, further comprising selecting, by the system, a block of layers of the neural network, and freezing the selected block of layers of the neural network so that weights of output connections from the frozen block of layers will not be updated for a training run.

14. The method of claim 8, further comprising utilizing artificial intelligence to facilitate selection of the subset of units.

15. A computer readable storage device comprising instructions that, in response to execution, cause a system comprising a processor to perform operations, comprising:
   identifying, by the processor, units of a neural network;
   selecting, by the processor, a random subset of units of the neural network; and
   freezing, by the processor, the selected subset of units of the neural network so that weights of output connections from the frozen subset of units will not be updated for a training run;
   wherein the freezing out of the selected subset of units of the neural network is performed in lieu of dropping out the selected units such that architecture of the neural network remains unchanged.

16. The computer readable storage device of claim 15, wherein the operations further comprise:
   selecting, by the processor, a layer of the neural network, and freezing the selected layer of the neural network so that weights of output connections from the frozen layer will not be updated for a training run.

17. The computer readable storage device of claim 15, wherein freezing the selected layer of the neural network causes architecture of the neural network to remain unchanged during training runs.

18. The computer readable storage device of claim 15, wherein the operations further comprise:
   selecting, by the processor, a block of layers of the neural network, and freezing the selected block of layers of the neural network so that weights of output connections from the frozen block of layers will not be updated for a training run.

19. The computer readable storage device of claim 15, wherein the freezing of the selected subset of units reduces dependence of the neural network on the frozen subset of units or layer.

20. The computer readable storage device of claim 15, wherein the freezing of the selected subset of units mitigates overfitting of the neural network on the frozen subset of units or layer.

* * * * *